United States Patent
Kirst et al.

(10) Patent No.: US 11,605,364 B2
(45) Date of Patent: Mar. 14, 2023

(54) LINE-BASED RENDERING FOR GRAPHICS RENDERING SYSTEMS, METHODS, AND DEVICES

(71) Applicant: Cypress Semiconductor Corporation, San Jose, CA (US)

(72) Inventors: Peter Kirst, Gilching (DE); Andreas Torno, Eching (DE); Roland Richter, Puchheim (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/324,879

(22) Filed: May 19, 2021

(65) Prior Publication Data
US 2022/0375434 A1 Nov. 24, 2022

(51) Int. Cl.
*G06T 1/20* (2006.01)
*G09G 5/37* (2006.01)
*G09G 5/36* (2006.01)

(52) U.S. Cl.
CPC ............ *G09G 5/37* (2013.01); *G06T 1/20* (2013.01); *G09G 5/363* (2013.01); *G09G 2340/045* (2013.01); *G09G 2340/0492* (2013.01)

(58) Field of Classification Search
CPC .... G09G 5/37; G09G 5/363; G09G 2340/045; G09G 2340/0492; G06T 1/20
See application file for complete search history.

(56) References Cited

U.S. PATENT DOCUMENTS

| | | | | |
|---|---|---|---|---|
| 9,569,862 | B2 * | 2/2017 | Wang | G06T 15/005 |
| 2002/0145611 | A1 * | 10/2002 | Dye | G09G 5/363 |
| | | | | 345/543 |
| 2018/0286106 | A1 * | 10/2018 | Apodaca | G06T 15/005 |
| 2021/0012453 | A1 * | 1/2021 | Sansottera | G06T 15/10 |

* cited by examiner

*Primary Examiner* — Samantha (Yuehan) Wang

(57) ABSTRACT

Systems, methods, and devices implement line-based rendering of graphics. Methods include receiving a command associated with graphical data, the command identifying a plurality of pixel mapping operations to be implemented on a plurality of data objects included in the graphical data. Methods also include determining a plurality of rendering parameters, the plurality of rendering parameters identifying a partitioning of the graphical data into a plurality of portions, and further identifying a pixel mapping operation for each of the plurality of portions. Methods further include generating a plurality of sub-commands based, at least in part, on the plurality of rendering parameters and the command, the plurality of sub-commands identifying a processing operation for each data object included in each of the plurality of portions of the graphical data. Methods also include implementing a processing operation for at least one portion based on at least some of the plurality of sub-commands.

20 Claims, 7 Drawing Sheets

US 11,605,364 B2

LINE-BASED RENDERING FOR GRAPHICS RENDERING SYSTEMS, METHODS, AND DEVICES

TECHNICAL FIELD

This disclosure generally relates to graphics rendering, and more specifically, to techniques used to implement such graphics rendering.

BACKGROUND

Computing devices and systems may include hardware and software configured to execute one or more software applications, and to display information associated with such software applications on display devices. For example, a computer system may include a host processor and a hard drive used to execute a software application, and data associated with the software application may be displayed in a monitor of the computer system. Such graphical data may be rendered by one or more components of the computer system for display in the display device. However, conventional systems remain limited in their ability to efficiently use resources, such as internal memory, when rendering and displaying such graphical data.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Computer systems may be configured to render and display graphical data in one or more target display devices. The rendering and display of such graphical data may involve the implementation of one or more transformation operations on the graphical data itself. For example, the rendering process may include resizing or rescaling of an image. In various embodiments, a processing operation associated with a particular element of an image or a frame, such as an object or image layer, is a pixel mapping operation that may also be referred to as a blit operation. Accordingly, a pixel mapping operation may be a numerical operation in which one or more input pixels is mapped to one or more output pixel in accordance with a designated mapping function. A pixel mapping operation can process multiple output pixels with the same numerical operation.

Conventional techniques remain limited because each pixel mapping operation requires a read operation from a memory, such as a video random-access memory (VRAM), as well as a source buffer, and also requires a write operation back to VRAM. Accordingly, an image or frame that includes, for example, multiple image layers may have multiple pixel mapping operations associated with it, as may be the case when each layer undergoes a pixel mapping operation. Thus, the processing of multiple pixel mapping operations for a single image or frame requires multiple VRAM accesses for the multiple pixel mapping operations.

Embodiments disclosed herein provide parallelization of processing operations as well as "line-by-line" rendering, thus reducing accesses to VRAM and improving overall efficiency and latency of rendering systems. More specifically, embodiments disclosed herein enable the splitting of a pixel mapping command into multiple sub-commands that may then be used to configure pipelines of graphics processing devices. In this way, the rendering of images or frames may be split into different portions, or ranges of lines, and each pixel mapping operation included in each portion may be implemented in parallel by the different pipelines. In this way, additional accesses to VRAM for intermediary results are not needed, and bandwidth overhead associated with such processing operations is reduced.

Figure 1:
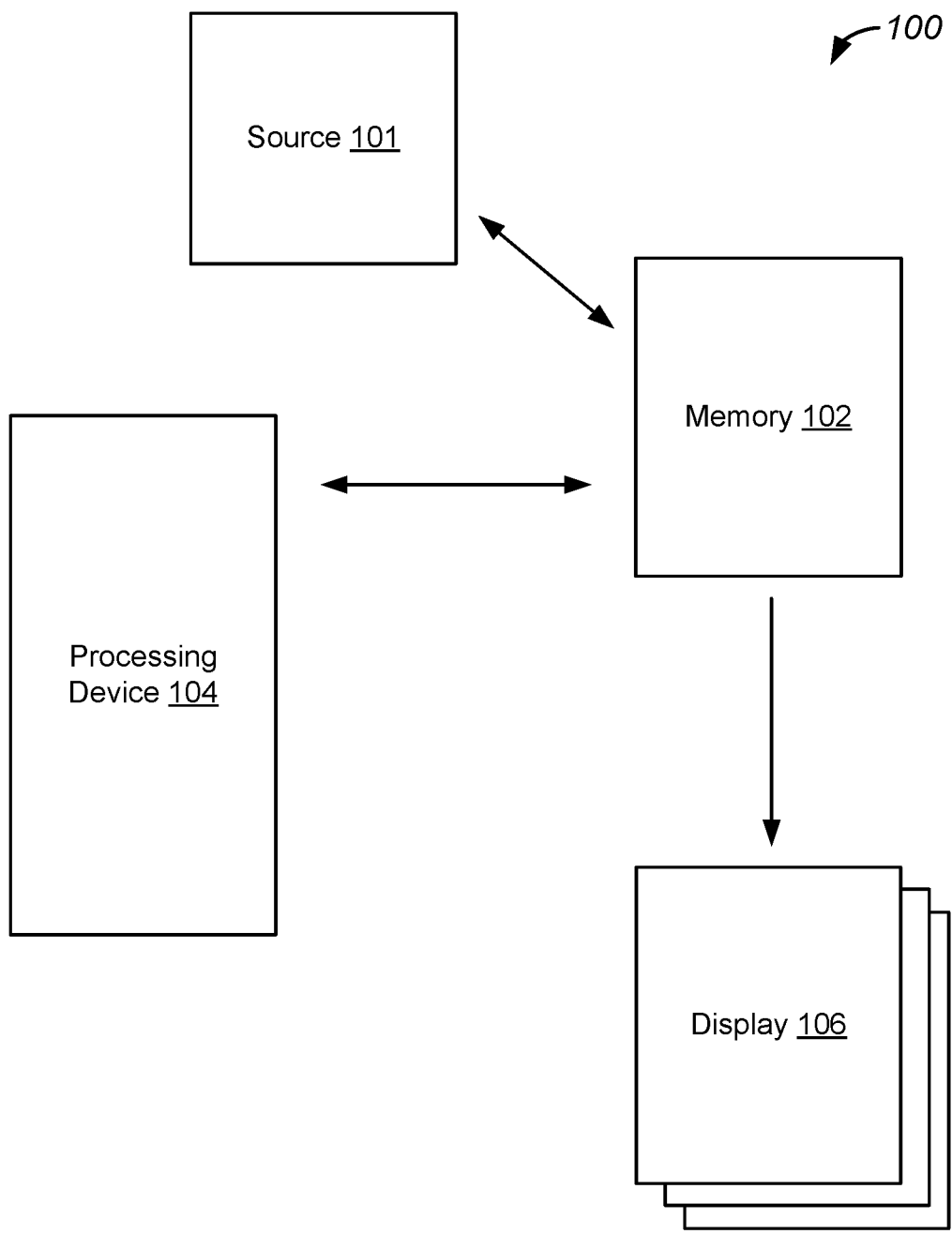
FIG. 1 illustrates an example of a system for line-based rendering, configured in accordance with some embodiments.

FIG. 1 illustrates an example of a system for line-based rendering, configured in accordance with some embodiments. As will be discussed in greater detail below, a system, such as system 100, may be configured to implement line-based rendering for graphical data that is ultimately presented at a display device. More specifically, graphical data that may include multiple layers of graphical information may be rendered and processing operations, such as pixel operations, may be implemented in a line-by-line manner. As will be discussed in greater detail below, such a line-by-line rendering enables the implementation of such processing operations in a manner that reduces memory accesses and internal bandwidth usage within system 100 thus increasing overall efficiency of system 100.

In various embodiments, system 100 includes source 101 that is configured to provide data that is ultimately displayed in a display device, as will be discussed in greater detail below. More specifically, source 101 may be configured to execute one or more software applications configured to generate graphical data to be displayed in a display device as, for example, may be included in a user interface generated for a particular software application. Additional details regarding such software applications and graphical data are discussed in greater detail below with reference to FIG. 2.

In various embodiments, source 101 is communicatively coupled to a memory device, such as memory 102. In various embodiments, memory 102 is a memory device such as a random-access memory (RAM). In one example, memory 102 is a video random-access memory (VRAM) device. Moreover, memory 102 may be communicatively coupled to source 101, and may include one or more buffers configured to store graphical data from source 101. Accordingly, the buffers may be used to store images or frames included in the graphical data.

System 100 further includes processing device 104 which may be communicatively coupled to memory 102, and may be configured to implement one or more processing operations on images and/or frames stored in memory 102. In various embodiments, such processing operations may include one or more pixel mapping operations. More specifically, processing operations may include re-sampling operations such as image rotation, orientation changes, and perspective correction. In various embodiments, such processing operations may include any suitable transformation of pixels or reordering of pixels. Moreover, the processing operations may include mapping multiple input pixels to an output pixel. Thus, an output pixel may be generated based on a mixture of multiple input pixels. Additional details regarding processing operations are discussed in greater detail below.

In various embodiments, processing device 104 is configured to implement such processing operations on graphical data on a line-by-line basis. Accordingly, processing operations initially identified to render a frame or image are not executed as sequential object-by-object operations, but instead, such object-by-object operations are split into sub-operations that may be executed in scan line order. In this way, processing operations underlying a rendering process may be executed using a dedicated static random-access memory (SRAM) buffer for a designated number of lines at a time, thus eliminating internal traffic bandwidth usage associated with memory 102 to store and retrieve intermediate results. Moreover, the implementation of such line-by-line processing operations allows the generation of content for a video stream "on-the-fly" and without the need for any storage of the resulting frames.

System 100 additionally includes display 106 which is configured to display the results of the rendering processing operations. Accordingly, display 106 may be a display device, such as a liquid crystal display (LCD) screen. As will be discussed in greater detail below, display 106 may include various components configured to receive rendered graphical data, and to display such rendered graphical data.

Figure 2:
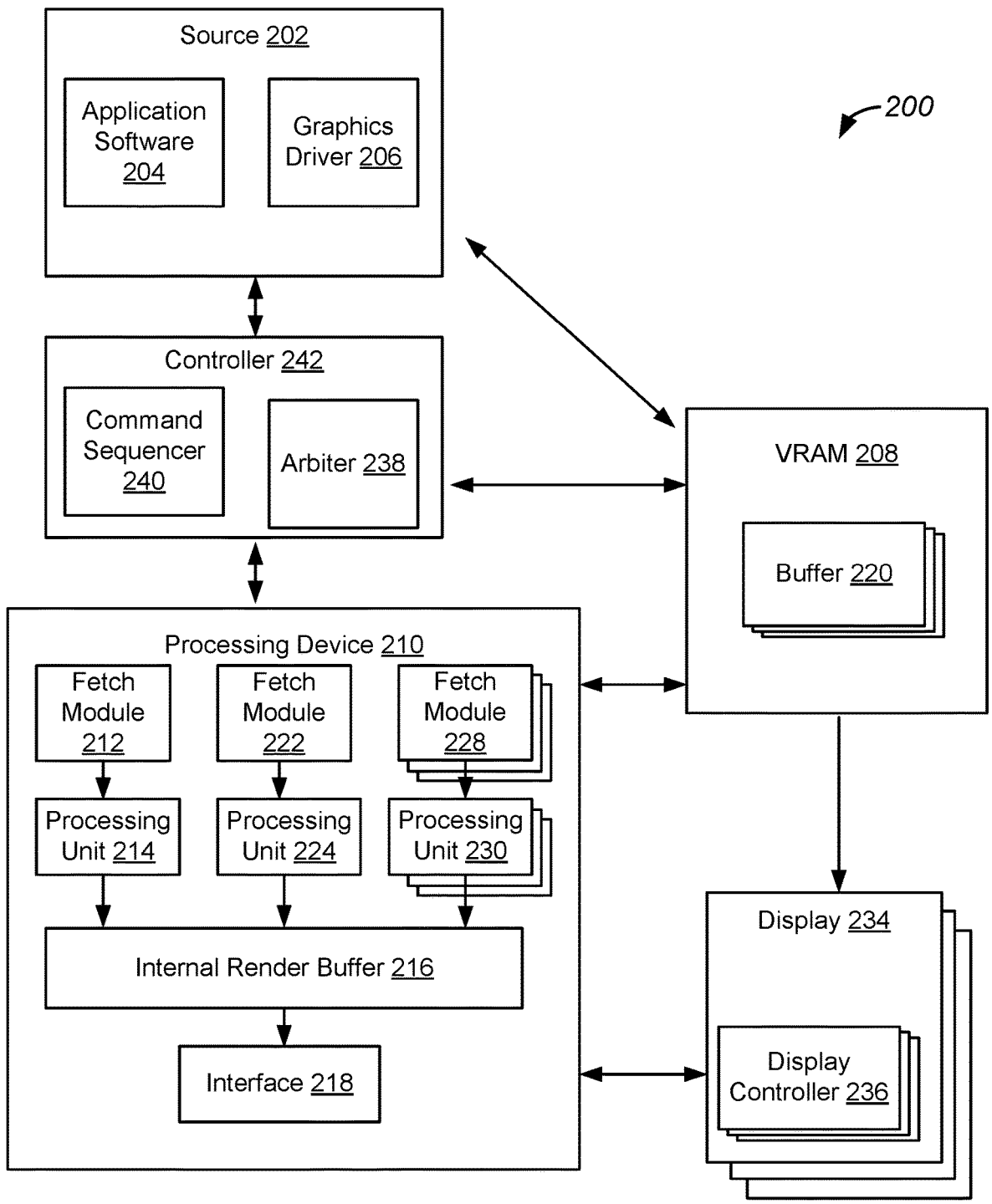
FIG. 2 illustrates another example of a system for line-based rendering, configured in accordance with some embodiments.

FIG. 2 illustrates another example of a system for line-based rendering, configured in accordance with some embodiments. As similarly discussed above, a system, such as system 200, may be configured to implement line-based rendering for graphical data that is ultimately presented at a display device. In various embodiments, processing operations underlying line-by-line rendering may reduce memory accesses and internal bandwidth usage within system 200. Moreover, as will be discussed in greater detail below, parallelization of such processing operations may further increase the overall efficiency of system 200.

In various embodiments, system 200 includes source 202 that is configured to generate graphical data for display in a display device, as will be discussed in greater detail below. As similarly discussed above, source 202 may be configured to execute one or more software applications configured to generate such graphical data. More specifically, source 202 may include application software 204 that is configured to execute a software application that generates video data. For example, the software application may generate a user interface screen to be presented in the display. In another example, the software application may generate video data to be presented in the display. In various embodiments, the graphical data may include one or more images or frames that may each include one or more graphical objects to be rendered. As will be discussed in greater detail below, such objects may be represented as different layers in the image or frame. Accordingly, such definition of layers and objects within each image or frame may be defined based on one or more data values within the image or frame itself, and may be included in the graphical data that is transmitted from source 202. In various embodiments, source 202 additionally includes graphics driver 206 which is configured to manage hardware compatibility between components of system 200. Accordingly, graphics driver 206 may ensure that transmitted graphical data is supported by a target display device.

In various embodiments, system 200 further includes a memory device, such as VRAM 208. Accordingly, as shown in FIG. 2, VRAM 208 may be communicatively coupled to source 202 and is configured to receive graphical data transmitted from source 202. In various embodiments, VRAM 208 includes one or more buffers, such as buffer 220, that are configured to store graphical data from source 202. Accordingly, buffer 220 may be configured to provide a temporary storage location for frames and images received from source 202. In various embodiments, VRAM 208 further includes a storage location configured to store commands associated with such frames and images. Accordingly, rendering operations associated with objects included in frames and images may be stored in such a storage location and retrieved when subsequently utilized for rendering.

System 200 additionally includes processing device 210 which is communicatively coupled to VRAM 208, and is configured to implement one or more processing operations on images and/or frames stored in VRAM 208. As similarly discussed above, such processing operations may include re-sampling operations such as image rotation, orientation changes, and perspective correction. Moreover, such processing operations may include any suitable transformation of pixels or reordering of pixels.

In various embodiments, processing device 210 is implemented as a graphics processing unit (GPU), and is configured to include various components capable of implementing the processing operations discussed above. More specifically, processing device 210 may include components that may be configured to handle fetch and store operations associated with memory locations in VRAM 208. For example, processing device 210 may include fetch module 212 that is configure retrieve graphical data from a storage location of VRAM 208. Accordingly, fetch module 212 may be configured to identify and retrieve graphical data for a designated number of lines and for a particular pixel mapping operation. More specifically, the designated number of lines may have been previously determined during an initial configuration operation, or by an entity such as a user or administrator. The designated number of lines may be a number of lines corresponding to a number of pixels along a vertical axis of an image or frame being rendered. Accordingly, the image or frame may be segmented into a number of sections or slices each defined by a number of lines. Additional details regarding the definition of slices are discussed in greater detail below with reference to FIG. 6.

Accordingly, fetch module 212 may be configured to fetch graphical data for a particular portion, such as a slice, of an image or frame being rendered, and another component, such as processing unit 214, may be configured to implement one or more processing operations on such graphical data. As discussed above, the processing operations implemented by processing unit 214 may be pixel transformation operations, such as orientation changes and perspective changes. In this way, processing unit 214 may implement one or more pixel-to-pixel mapping operations on the graphical data that was provided by fetch module 212. As will be discussed in greater detail below, the transformation operation implemented by processing unit 214 may have been identified by a system component, such as command sequencer 240, based, at least in part, on the commands stored in VRAM 208 discussed above.

In various embodiments, processing device 210 additionally includes fetch module 222 and fetch module 228 as well as processing unit 224 and processing unit 230 that may be configured to implement fetch and processing operations for a particular portion of an image or a frame being rendered, and for particular processing operations associated with such a portion. More specifically, multiple fetch and operator modules may be implemented to form different processing pipelines for different identified pixel mapping operations in a particular portion of an image or a frame that is being rendered. In one example, a particular slice of an image may include three pixel mapping commands associated with three objects included in the slice. Fetch module 212 and processing unit 214 may handle processing operations for the first object in the slice. Fetch module 222 and processing unit 224 may handle processing operations for the second object in the slice. Moreover, fetch module 228 and processing unit 230 may handle processing operations for the third object in the slice. In this way, different pixel mapping operations associated with different objects in an image or frame being rendered may be split into sub-operations, and such sub-operations may be handled in a parallel manner by parallel pipelines of processing device 210, and on a line-by-line or slice-by-slice basis.

Processing device 210 additionally includes internal render buffer 216 that is configured to store results of the operator modules discussed above. Accordingly, internal render buffer 216 may combine the results into a data object that represents the rendered result of the portion or slice that is currently being processed. As discussed above, internal render buffer 216 may be included in an SRAM module included processing device 210. Accordingly, the use of internal render buffer 216 eliminates the need for additional accesses to VRAM 208.

In various embodiments, processing device 210 additionally includes interface 218 that is configured to store rendered graphical data in a storage location of VRAM 208. Accordingly, the result of the rendered lines may be retrieved from internal render buffer 216, and may be stored in a storage location of VRAM 208. In this way, the result of the rendered lines is stored, and no additional VRAM accesses are utilized for intermediary results. In various embodiments, interface 218 is communicatively coupled to one or more other system components, such as components of display 234. Accordingly, in various embodiments, interface 218 is configured to provide direct communication with display 234 and display controller 236. In this way, interface 218 would not write to a buffer of VRAM 208, but instead would send data directly to one or more components of display 234, such as display controller 236.

As shown in FIG. 2, system 200 additionally includes controller 242, which may include various components such as command sequencer 240 and arbiter 238. In various embodiments, command sequencer 240 is configured to retrieve command data from VRAM 208, and generate commands for the fetch and operator modules discussed above. More specifically, command sequencer 240 is configured to segment pixel mapping commands corresponding to pixel mapping operations into sub-operations specific to each portion or slice of an image or frame being rendered. As discussed above, a pixel mapping command may be associated with an object included in an image or frame that is being rendered. In various embodiments, command sequencer 240 may be configured to generate multiple commands based on a designated number of portions as well as a designated number of objects. In this way, commands may be generated for the fetch and operator modules for each portion or slice of the image, and for each object within each portion or slice.

System 200 further includes arbiter 238 that is configured to manage the utilization of fetch and operator modules. More specifically, arbiter 238 may identify a number of fetch and operator modules to be utilized based on a number of objects included in an image or frame being rendered. Arbiter 238 may then assign particular fetch and operator modules to operations associated with those objects. For example, if three objects are included in an image being rendered, fetch module 212 and processing unit 214 may be assigned to the first object, fetch module 222 and processing unit 224 may be assigned to the second object, and fetch module 228 and processing unit 230 may be assigned to the third object. In this way, arbiter 238 may dynamically assign resources of processing device 210 to processing operations.

System 200 further includes display 234 which is configured to display the results of the rendering processing operations. As discussed above, display 234 may be a display device, such as a liquid crystal display (LCD) screen. In various embodiments, display 234 includes include various components configured to receive rendered graphical data, and to display such rendered graphical data. For example, display 234 may include display controller 236 which is configured to generate a video signal that is ultimately displayed in a display device of display 234. Accordingly, display controller 236 may manage the operation of the display device based, at least in part, on the received rendered graphical data.

Figure 3:
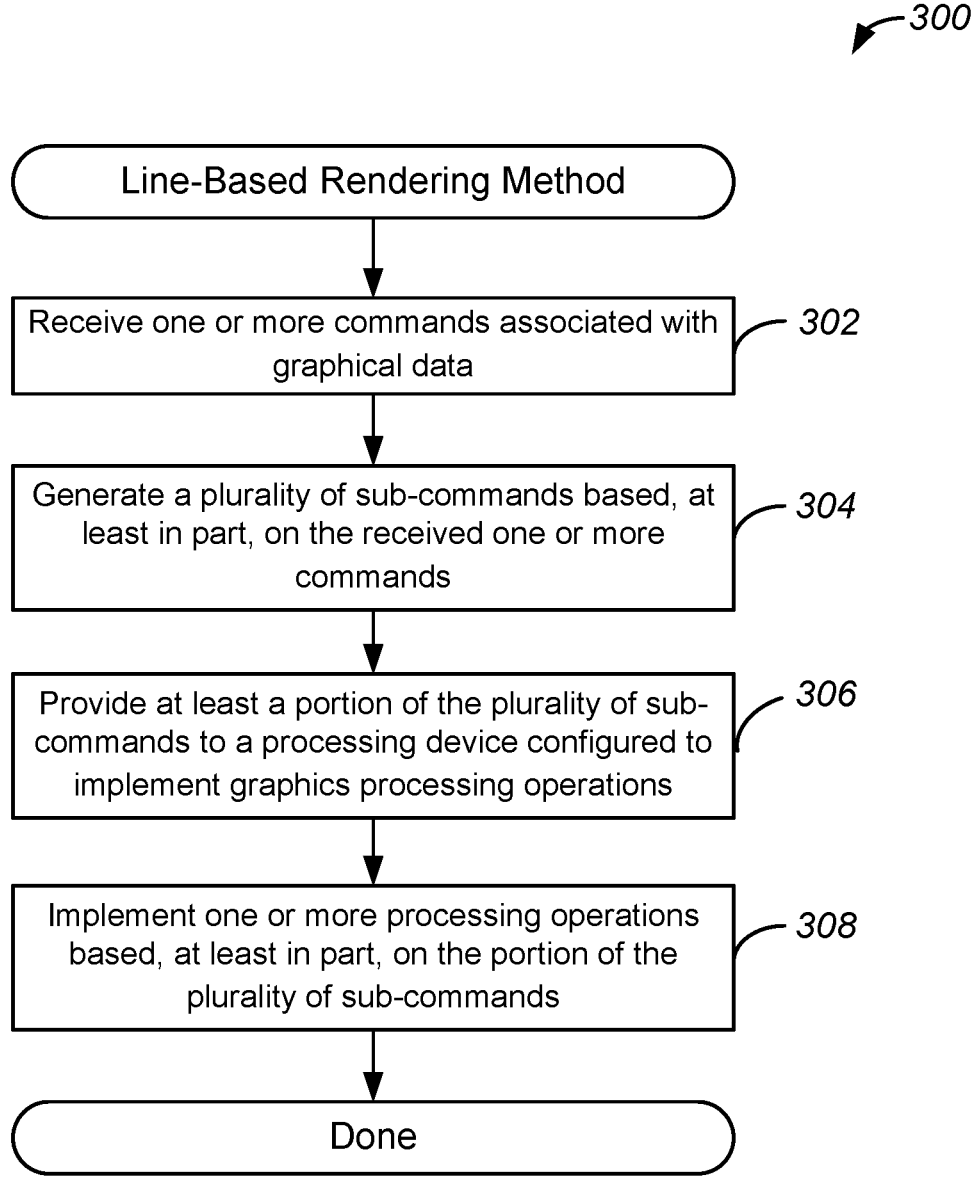
FIG. 3 illustrates a flow chart of an example of a method for line-based rendering, implemented in accordance with some embodiments.

FIG. 3 illustrates a flow chart of an example of a method for line-based rendering, implemented in accordance with some embodiments. As will be discussed in greater detail below, a method, such as method 300, may be configured to implement line-based rendering for graphical data that is ultimately presented at a display device. As similarly discussed above, such line-by-line rendering enables the implementation of such processing operations in a manner that reduces memory accesses and internal bandwidth usage, and also reduces the use of memory resources, such as frame buffers.

Method 300 may include operation 302 during which one or more commands may be received. In various embodiments, the command may be received from one or more components of a source of graphical data, such as a software application. As discussed above, a software application may generate data for display in a display device, and may also generate a request or a command corresponding to such data that is to be displayed. The command may include the graphical data itself, which may include pixel information, and may also include one or more other graphics parameters, such as image layer or object information as well as any other suitable information, such as size and resolution information.

Method 300 may proceed to operation 304 during which a plurality of sub-commands may be generated. As similarly discussed above, one or more components of a controller may generate multiple sub-commands based on the received command. More specifically, different sets of commands may be generated based on a number of portions or slices in the image or frame being rendered, as well as a number of objects and/or image layers included in the image or frame that is being rendered. As also discussed above, the number of portions may be a designated number, or may be determined based on one or more system parameters, such as a size of an internal render buffer, and a number of scan lines that may be stored in the internal render buffer. Moreover, the number of objects and/or image layers may be determined based on data values included in the command and provided by the software application.

Method 300 may proceed to operation 306 during which a portion of the plurality of sub-commands may be provided to a processing device configured to implement graphics processing operations. Accordingly, the sub-commands may be provided to the processing device, and the sub-commands may be used to implement several fetch operations to fetch graphical data that is to be rendered. In various embodiments, the fetch operations may be for a specific portion or slice of an image that is being rendered. Accordingly, only graphical data for the currently active or selected slice may be fetched.

Method 300 may proceed to operation 308 during which one or more processing operations may be implemented based, at least in part, on the portion of the plurality of sub-commands. Accordingly, pipelines of the processing device may implement the processing operations in parallel, and in accordance with operations specified in the sub-commands. For example, a particular type of transformation may have been specified in a sub-command, and may be implemented during operation 308. Once complete, the results may be stored in a memory of the processing device and also written to a storage location in memory. It will be appreciated that multiple iterations of processing operations may be implemented to process all portions or slices of the graphical data being rendered.

Figure 4:
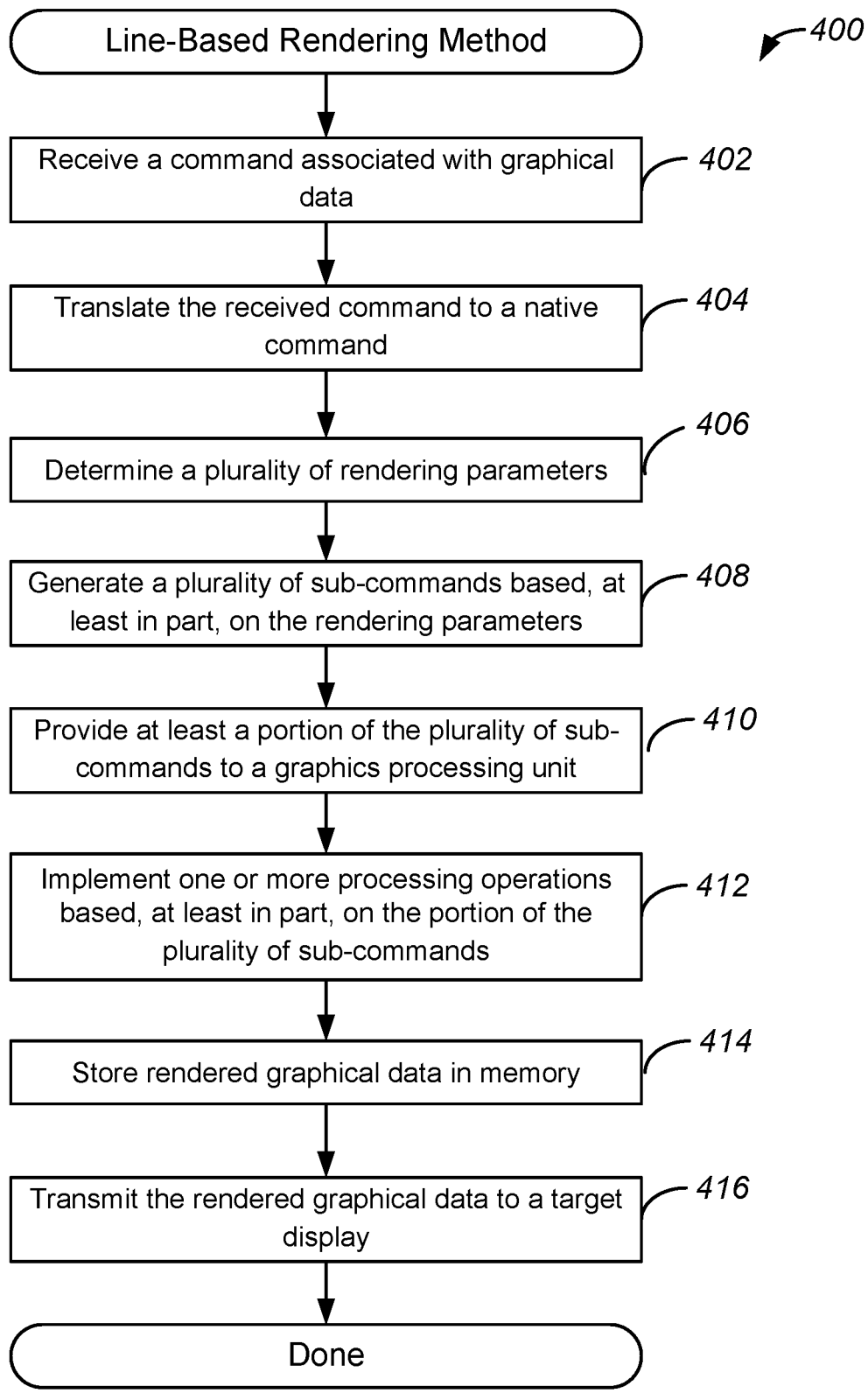
FIG. 4 illustrates a flow chart of another example of a method for line-based rendering, implemented in accordance with some embodiments.

FIG. 4 illustrates a flow chart of another example of a method for line-based rendering, implemented in accordance with some embodiments. As will be discussed in greater detail below, a method, such as method 400, may be configured to implement line-based rendering for graphical data that is ultimately presented at a display device. As will also be discussed in greater detail below, such line-based rendering may be implemented in the context of a system that includes a graphics processing unit and associated components.

Method 400 may include operation 402 during which a command may be received. As similarly discussed above, the command may be received from one or more components of a source of graphical data, such as a software application. More specifically, the software application may generate data for display in a display device. Such data may represent a user interface, an image, a frame of a video, or any other suitable visual information or data object. The software application may generate a command associated with such graphical data, and the command may include various rendering and display parameters. For example, the command may identify a target display for the graphical data, a target application for the graphical data, as well as one or more aspects of the graphical data itself, such as a size and resolution of an image or frame being rendered. As discussed above, the command may also include the graphical data itself, which may include pixel information, and may also include additional graphics parameters, such as spatial or structural information. More specifically, the command may include additional graphics parameters that identify image layer or object information.

Method 400 may proceed to operation 404 during which the received command may be translated to a native command. In various embodiments, the command may be received from one or more components of a source of graphical data, such as the software application discussed above. In various embodiments, the command may be translated from a format used by the software application to a format that is native to the hardware underlying one or more system components, such as a processing device as discussed in greater detail below. Accordingly, such translation may be implemented by a graphics driver, and the translated command may be transmitted to one or more components of the system. For example, the translated command may be stored in a storage location of a storage device, such as a VRAM module.

Method 400 may proceed to operation 406 during which a plurality of rendering parameters may be determined. In various embodiments, the rendering parameters may be one or more parameters that, among other things, identify how the command is to be split into sub-commands. More specifically, the rendering parameters may define how a command is to be split into multiple sub-commands. As will be discussed in greater detail below, such sub-commands may be sets of commands specific to particular pipelines of a graphics processing unit, and specific to a particular portion or slice of graphical data.

In various embodiments, the rendering parameters may include parameters such as a number of portions or slices of the graphical data that will be implemented, and a number of objects or image layers in each portion. In one example, the number of portions or slices may be a designated number, or may be determined based on one or more system parameters, such as a size of an internal render buffer, and a number of scan lines that may be stored in the internal render buffer. For example, an image may be a designated number of pixels high. A system component, such as a controller, may divide that number of pixels by a designated number to obtain a number of portions or slices to be used. As discussed above, the designated number may have been initially configured or may be determined based on system parameters. In one example, a slice may be eight lines high. In various embodiments, the number of objects or image layers included in each portion may be determined based on the graphical data itself. In this way, a system component, such as the controller, may query the graphical data and generate the rendering parameters.

Method 400 may proceed to operation 408 during which a plurality of sub-commands may be generated based, at least in part, on the plurality of rendering parameters. As similarly discussed above, one or more components of a controller may generate multiple sub-commands based on the received command. More specifically, different sets of commands may be generated based on a number of portions or slices in the image or frame being rendered, as well as a number of objects and/or image layers included in the image or frame that is being rendered. Accordingly, for each identified portion, the controller may generate a set of commands that identify one or more processing operations for each object and/or image layer included in that portion. In one example, the controller may identify a number of objects included in a slice, and may generate a set of sub-commands for that slice, where the set includes a sub-command for each portion of each object. Moreover, as discussed above, the number of objects and/or image layers may be determined based on data values included in the received command as may have initially been identified by the software application.

Method 400 may proceed to operation 410 during which a portion of the plurality of sub-commands may be provided to a graphics processing unit. Accordingly, a portion of the sub-commands generated during operation 408 may be provided to a graphics processing unit as discussed above, and the sub-commands may be used to implement several fetch operations to fetch graphical data that is to be rendered. In various embodiments, the fetch operations may be for a specific portion or slice of an image that is being rendered. Accordingly, each utilized pipeline of the graphics processing unit may have been assigned an object or image layer. During operation 410, a fetch operation may be implemented by each pipeline for its respective object or image layer.

Method 400 may proceed to operation 412 during which one or more processing operations may be implemented based, at least in part, on the portion of the plurality of sub-commands. Accordingly, pipelines of the graphics processing may implement the processing operations in parallel, and in accordance with operations specified in the sub-commands. For example, each pipeline may implement a processing operation on its fetched data based on a processing operation specified by the sub-command. As discussed above, such processing operations may be pixel transformations that include numerical operations in which an input pixel is mapped to an output pixel.

Method 400 may proceed to operation 414 during which the rendered graphical data may be stored in memory. Accordingly, once the processing operations have been completed for a slice, the processed data may be stored in an internal render buffer included in the graphics processing unit. Moreover, the processed lines of the image included in the portion or slice may be transmitted to another storage location of another storage device. More specifically, the processed data may be transmitted to a VRAM module, and may be stored in a line buffer of the VRAM module.

Method 400 may proceed to operation 416 during which the rendered graphical data may be transmitted to a target display. Accordingly, the processed data may be transmitted from the VRAM module to the target display. In one example, the data maybe received by a display controller that is configured to blend layer information and generate a signal that is ultimately displayed in the target display device. Accordingly, the processed and rendered data may be displayed at the target display, which may be a liquid crystal display, or may include multiple display devices, as may be the case for a clustered display. In various embodiments, the rendered graphical data may be sent directly from the graphics processing unit to the target display. Thus, according to various embodiments, one or more portions of operation 414 may be bypassed. More specifically, the rendered graphical data might not be stored in VRAM, but instead may be sent directly from the graphics processing unit to the target display device.

Figure 5:
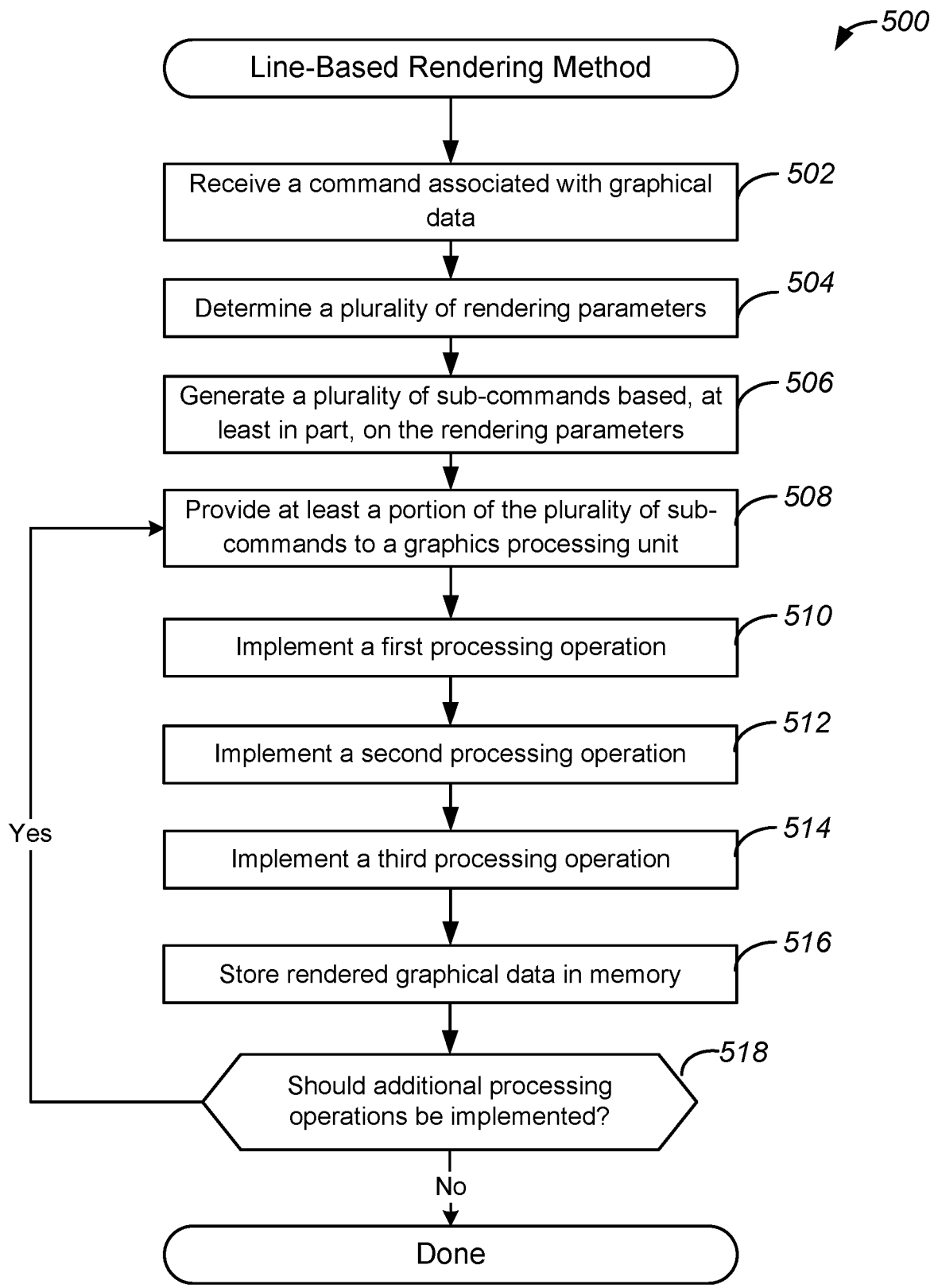
FIG. 5 illustrates a flow chart of yet another example of a method for line-based rendering, implemented in accordance with some embodiments.

FIG. 5 illustrates a flow chart of yet another example of a method for line-based rendering, implemented in accordance with some embodiments. As will be discussed in greater detail below, a method, such as method 500, may be configured to implement line-based rendering for graphical data that is ultimately presented at a display device. As will also be discussed in greater detail below, different processing operations may be parallelized by different pipelines of a graphics processing unit. In this way, commands used to implement pixel mapping operations may be split into sub-commands, and implementation of such sub-commands may be parallelized in a line-by-line manner.

Method 500 may include operation 502 during which a command may be received. As similarly discussed above, the command may be received from one or more components of a source of graphical data, such as a software application. Accordingly, the software application may generate a command associated with the graphical data, and the command may include various rendering and display parameters. As discussed above, the command may identify a target display for the graphical data, a target application for the graphical data, as well as one or more aspects of the graphical data itself, such as a size and resolution of an image or frame being rendered. Moreover, the command may also include the graphical data itself, which may include pixel information, and may also include additional rendering parameters, such as spatial or structural information.

Method 500 may proceed to operation 504 during which a plurality of rendering parameters may be determined. As similarly discussed above, the rendering parameters may be one or more parameters that, among other things, identify how the command is to be split into sub-commands. More specifically, the rendering parameters may define how a command is to be split into multiple sub-commands. As will be discussed in greater detail below, such sub-commands may be sets of commands specific to particular pipelines of a graphics processing unit, and specific to a particular portion or slice of graphical data.

Method 500 may proceed to operation 506 during which a plurality of sub-commands may be generated based, at least in part, on the plurality of rendering parameters. As similarly discussed above, one or more components of a controller may generate multiple sub-commands based on the received command. More specifically, different sets of commands may be generated based on a number of portions or slices in the image or frame being rendered, as well as a number of objects and/or image layers included in the image or frame that is being rendered. Accordingly, for each identified portion, the controller may generate a set of commands that identify one or more processing operations for each object and/or image layer included in that portion.

Method 500 may proceed to operation 508 during which a portion of the plurality of sub-commands may be provided to a graphics processing unit. Accordingly, a portion of the sub-commands generated during operation 506 may be provided to a graphics processing unit as discussed above, and the sub-commands may be used to implement several fetch operations to fetch graphical data that is to be rendered. In various embodiments, the fetch operations may be for a specific portion or slice of an image that is being rendered. Accordingly, each utilized pipeline of the graphics processing unit may have been assigned an object or image layer. During operation 508, a fetch operation may be implemented by each pipeline for its respective object or image layer.

Method 500 may proceed to operation 510 during which a first processing operation may be implemented. In various embodiments, the first processing operation may be assigned to a first pipeline of the graphics processing unit by the controller. As discussed above, the first pipeline may include a first processing unit that is configured to implement one or more pixel transformation operations, such as orientation changes or perspective changes. Accordingly, the first processing unit may implement a first pixel mapping operation, such as a resizing operation. Moreover, the pixel transformation may be applied to a first object or image layer of the currently selected slice.

Method 500 may proceed to operation 512 during which a second processing operation may be implemented. In various embodiments, the second processing operation is assigned to a second pipeline of the graphics processing unit by the controller. As discussed above, the second pipeline includes a second processing unit that is also configured to implement one or more pixel transformation operations. Accordingly, the second processing unit may implement a second pixel mapping operation, such as an orientation change. Moreover, the pixel transformation may be applied to a second object or image layer of the currently selected slice.

Method 500 may proceed to operation 514 during which a third processing operation may be implemented. In various embodiments, the third processing operation is assigned to a third pipeline of the graphics processing unit by the controller. As discussed above, the third pipeline includes a third processing unit that is also configured to implement one or more pixel transformation operations. Accordingly, the third processing unit may implement a third pixel mapping operation, such as a perspective change. Moreover, the pixel transformation may be applied to a third object or image layer of the currently selected slice.

Accordingly, as discussed above, multiple different processing operations may be implemented in parallel by different pipelines of a graphics processing unit, and the commands governing each pipeline may be sub-commands generated from a command initially received from a source of the graphical data. In this way, multiple different processing operations corresponding to different pixel mapping operations may be implemented in parallel, and in accordance with a "line-by-line" basis in which a designated number of lines may be processed at a time.

Method 500 may proceed to operation 516 during which the rendered graphical data may be stored in memory. Accordingly, once the processing operations have been completed for a slice, the processed data may be stored in an internal render buffer included in the graphics processing unit. Moreover, the processed lines of the image included in the portion or slice may be transmitted to another storage location of another storage device. More specifically, the processed data may be transmitted to a VRAM module, and may be stored in a line buffer of the VRAM module.

Method 500 may proceed to operation 518 during which it may be determined if additional processing operations should be implemented. In some embodiments, such a determination may be made based on a currently active or selected portion or slice, as well as a total number of portions or slices. For example, the graphics processing unit may iteratively step through all of the slices defined for an image or frame being rendered. Such progress may be monitored by a component, such as a controller. For example, the controller may implement a state machine to track such progress. In this way, the controller may determine if additional slices of the image remain and should be processed. If it is determined that additional processing operations should be implemented, method 500 may return to operation 508. If it is determined that no additional processing operations should be implemented, method 500 may terminate.

Figure 6:
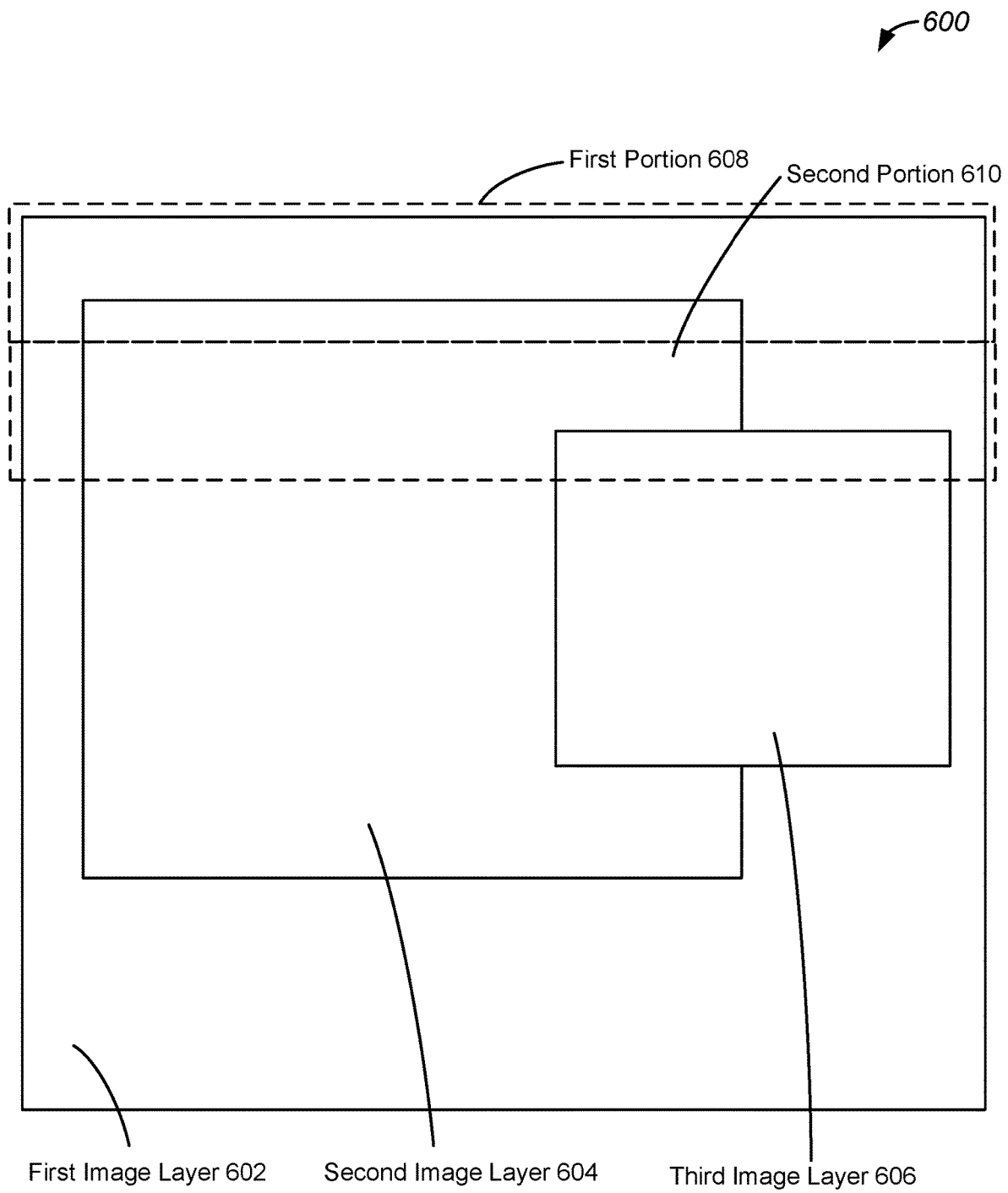
FIG. 6 illustrates an example of an image undergoing line-based rendering in accordance with some embodiments.

FIG. 6 illustrates an example of an image undergoing line-based rendering in accordance with some embodiments. As similarly discussed above, an image, such as image 600, may include multiple objects that are to be rendered. For example, image 600 may include a first object in first image layer 602, a second object in second image layer 604, and a third object in third image layer 606. In various embodiments, pixel mapping operations may have been identified by, for example, a source, for each of first image layer 602, second image layer 604, and third image layer 606.

Moreover, image 600 may be segmented into multiple portions or slices, such as first portion 608 and second portion 610. While two portions are shown, it will be appreciated that all of image 600 may be segmented into such portions. As discussed above, pixel mapping operations and commands may be sequenced and allocated to different processing pipelines of a processing device for each portion. Accordingly, a command sequencer may retrieve the commands for the pixel mapping operations and may generate a first set of commands for first portion 608, a second set of commands for second portion 610, as well additional sets of commands for any additional portions. Each set of commands may identify a particular portion, as may be identified by a range of lines or pixels, a processing operation, as well as a target data object and associated image layer on which the processing operation is to be implemented. As shown in FIG. 6, first portion 608 may have two sets of commands corresponding to two objects in two image layers while second portion 610 has three sets of commands for three objects in three image layers.

Figure 7:
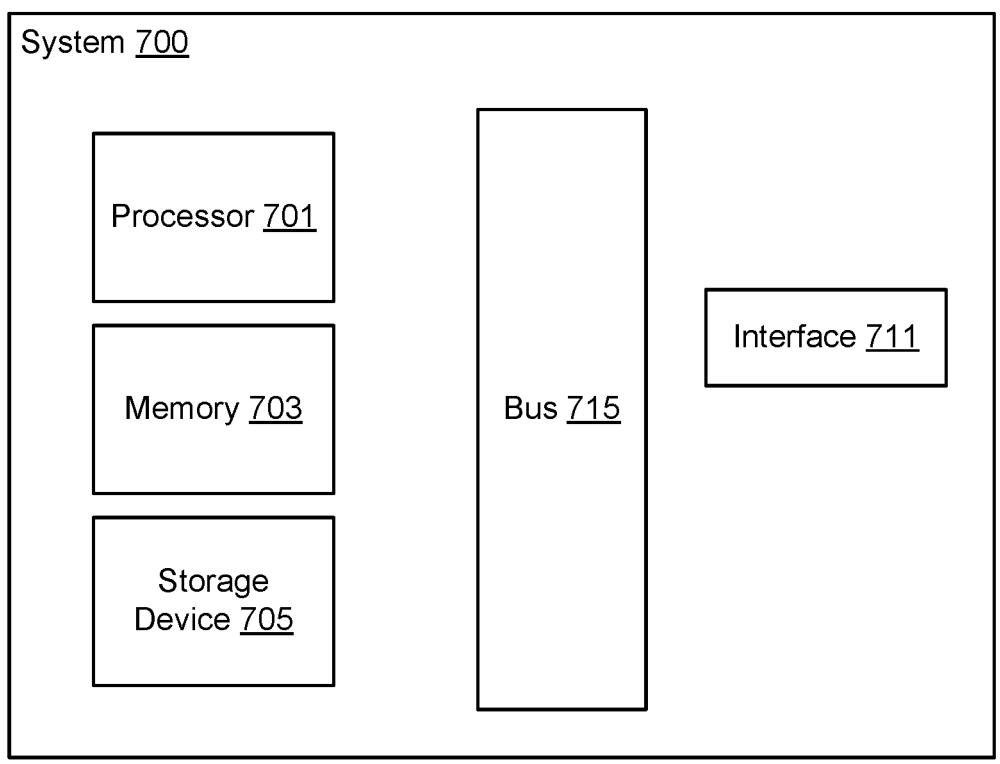
FIG. 7 illustrates an example of components of a processing device, configured in accordance with some embodiments.

FIG. 7 illustrates an example of components of a processing device, configured in accordance with some embodiments. Accordingly, a system, such as system 700 described below, may be used to implement the components of controllers and/or processing devices discussed above. In various embodiments, system 700 includes processor 701, memory module 703, storage device 705, interface 711, and bus 715 (e.g., a PCI bus or other interconnection fabric). System 700 may operate as variety of devices such as graphics processing unit, or any other rendering device described herein. Although a particular configuration is described, a variety of alternative configurations are possible. Processor 701 may perform operations such as those described herein. Instructions for performing such operations may be embodied in memory 703 on one or more non-transitory computer readable media, or on some other storage device. Various specially configured devices can also be used in place of or in addition to the processor 701. The interface 711 may be configured to send and receive data values to and from other system components, as discussed above with reference to FIGS. 1 and 2.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving a command associated with graphical data, the command identifying a plurality of pixel mapping operations to be implemented on a plurality of data objects included in the graphical data;
determining, using one or more processors, a plurality of rendering parameters, the plurality of rendering parameters identifying a partitioning of the graphical data into a plurality of portions, and further identifying at least one pixel mapping operation for each of the plurality of portions;
generating, using the one or more processors, a plurality of sub-commands based, at least in part, on the plurality of rendering parameters and the command, the plurality of sub-commands identifying a processing operation for each of the plurality of portions of the graphical data, wherein the command is an object-by-object command, wherein the plurality of sub-commands is configured to execute the object-by-object command in scan line order, and wherein a number of the plurality of sub-commands is determined based on the plurality of rendering parameters and a number of pipelines in a graphics processing unit; and implementing, using the one or more processors, at least one processing operation for at least one portion based on at least some of the plurality of sub-commands.

2. The method of claim 1, wherein the graphical data comprises an image, and wherein the plurality of data objects comprises a plurality of image layers.

3. The method of claim 2, wherein the plurality of portions comprises a plurality of slices of the image.

4. The method of claim 3, wherein each slice of the plurality of slices is defined based on a predetermined number of scan lines.

5. The method of claim 1 further comprising:
implementing, using the one or more processors, an additional processing operation for at least one portion based on at least some of the plurality of sub-commands.

6. The method of claim 5, wherein the at least one processing operation and the additional processing operation are implemented in parallel.

7. The method of claim 6, wherein the at least one processing operation and the additional processing operation are implemented for different data objects.

8. The method of claim 1, wherein the at least one processing operation is a pixel transformation operation selected from a group consisting of: an orientation change, a perspective change, and a size change.

9. The method of claim 1, wherein the graphical data comprises a video frame, and wherein the plurality of data objects comprises a plurality of objects in a video.

10. A device comprising:
a controller comprising one or more processors configured to:
receive a command associated with graphical data, the command identifying a plurality of pixel mapping operations to be implemented on a plurality of data objects included in the graphical data;
determine a plurality of rendering parameters, the plurality of rendering parameters identifying a partitioning of the graphical data into a plurality of portions, and further identifying at least one pixel mapping operation for each of the plurality of portions;
generate a plurality of sub-commands based, at least in part, on the plurality of rendering parameters and the command, the plurality of sub-commands identifying a processing operation for each of the plurality of portions of the graphical data, wherein the command is an object-by-object command, wherein the plurality of sub-commands is configured to execute the object-by-object command in scan line order, and wherein a number of the plurality of sub-commands is determined based on the plurality of rendering parameters and a number of pipelines in a graphics processing unit; and
a graphics processing unit comprising one or more processors configured to implement at least one processing operation for at least one portion based on at least some of the plurality of sub-commands.

11. The device of claim 10, wherein the graphical data comprises an image, wherein the plurality of data objects comprises a plurality of image layers, and wherein the plurality of portions comprises a plurality of slices of the image.

12. The device of claim 10, wherein the graphics processing unit is further configured to:
implement an additional processing operation for at least one portion based on at least some of the plurality of sub-commands.

13. The device of claim 12, wherein the at least one processing operation and the additional processing operation are implemented in parallel.

14. The device of claim 10, wherein the at least one processing operation is a pixel transformation operation selected from a group consisting of: an orientation change, a perspective change, and a size change.

15. A system comprising:
a host processor and memory configured to execute a software application and graphics driver;
a controller comprising one or more processors configured to:
receive a command from the graphics driver, the command identifying a plurality of pixel mapping operations to be implemented on a plurality of data objects included in graphical data;
determine a plurality of rendering parameters, the plurality of rendering parameters identifying a partitioning of the graphical data into a plurality of portions, and further identifying at least one pixel mapping operation for each of the plurality of portions;
generate a plurality of sub-commands based, at least in part, on the plurality of rendering parameters and the command, the plurality of sub-commands identifying a processing operation for each of the plurality of portions of the graphical data, wherein the command is an object-by-object command, wherein the plurality of sub-commands is configured to execute the object-by-object command in scan line order, and wherein a number of the plurality of sub-commands is determined based on the plurality of rendering parameters and a number of pipelines in a graphics processing unit; and
a graphics processing unit comprising one or more processors configured to implement at least one processing operation for at least one portion based on at least some of the plurality of sub-commands; and
a display device configured to display a result of the at least one processing operation.

16. The system of claim 15, wherein the graphical data comprises an image, wherein the plurality of data objects comprises a plurality of image layers, and wherein the plurality of portions comprises a plurality of slices of the image.

17. The system of claim 15, wherein the graphics processing unit is further configured to:
implement an additional processing operation for at least one portion based on at least some of the plurality of sub-commands.

18. The system of claim 15, wherein the received command is a translated command that has been translated by the graphics driver.

19. The system of claim 15, wherein the graphics processing unit is further configured to:
implement an additional processing operation for at least one portion based on at least some of the plurality of sub-commands, wherein the at least one processing operation and the additional processing operation are implemented in parallel.

20. The system of claim 15, wherein the at least one processing operation is a pixel transformation operation selected from a group consisting of: an orientation change, a perspective change, and a size change.

* * * * *